Patented Jan. 23, 1934

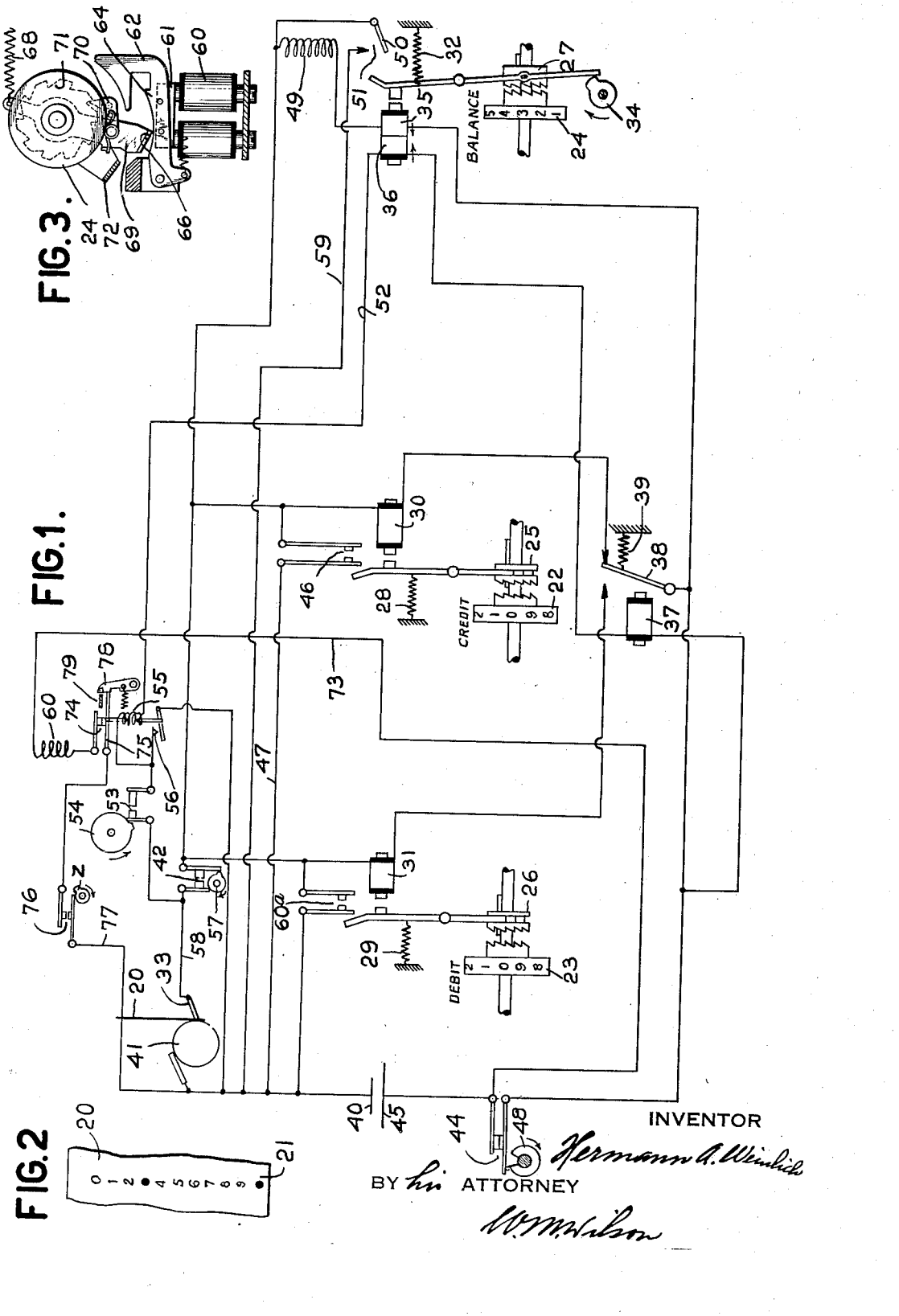

1,944,677

UNITED STATES PATENT OFFICE 1,944,677

DEBIT AND CREDIT TABULATOR

Hermann Adalbert Weinlich, Berlin, Germany, assignor, by mesne assignments, to International Business Machines Corporation, New York, N. Y., a corporation of New York Application June 5, 1931. Serial No. 542,285

20 Claims. (Cl. 235—92)

This case is a continuation in part of applicant's application Serial No. 174,780, filed March 12, 1927, and which application identified corresponds to the German application filed March 20, 1926, application No. T-31,579; the British Patent No. 304,383; Canadian Patent No. 302,374, and the French Patent No. 647,749.

It relates to accounting machines and more particularly to record controlled machines which may subtract as well as add.

When tabulating machines are used in commercial houses for clearing accounts with customers, it is desirable to not only automatically enter items into the machine and obtain totals but also to obtain the differences or balances.

The instant invention has for one of its objects the provision of improved tabulating means for automatically obtaining said balances or differences.

The invention makes use of the fact that the subtraction calculations can be made as accumulating calculations provided that the items of one kind are introduced into the calculation with the actual amounts whereas the items of another kind are introduced with the amounts of their complements and that, if necessary, the total which then is found may be mentally supplemented to its tens complement or converted by any of the prior art arrangements as in Patents 1,370,428 and 1,369,791.

For instance, if it is desired to determine and indicate the difference between the numbers 368 and 243, then this subtraction can be made as an accumulation by adding to the number 368, the tens complement of 243, which is 99757; as

```
        368
     99757
     ------
     00125
``` or by adding to 243, the tens complement of 368 which is 99632; as

```
     99632
        243
     ------
     99875
``` of which the complement is 00125.

The determination of balances can be effected in this way by a tabulating machine if the machine is provided not only with the usual item accumulators, but also with a balance accumulator in which the several items are entered, one class of items as direct values and the other as complement values.

If one proceeds in this way, the balance accumulator would show the true value of the differences between the two classes of items if the items whose sum of complements is entered is exceeded by the items the sum of whose direct values is entered. If the reverse is true, then the result appears as a complement value and to obtain the balance in its true values, the complement of said result is taken. In the previously mentioned case, the complementary values of one class of items are entered into the balance accumulator under control of tabulating cards which are punched with the complementary values of said class of items. The punching of a card with complementary values has the disadvantage of either compelling the operator in punching said card to make a preliminary calculation with a possibility of error in the calculation or necessitates the use of a special punching machine.

The object of this invention is to overcome these disadvantages by controlling the balance accumulator by tabulating cards having the direct values of each class of items punched thereon.

In this case, however, provision must be made to transmit to the balance accumulator the tens complement values of the direct values of one class of items punched on the cards. In order to do this, a differential control of the balance accumulator must be had in accordance with the class of items punched on the cards. In order to obtain this differential control of the balance accumulator, the controlling card is distinguished in accordance with the class of items it represents by the presence or absence of a characteristic designation.

For example, if credit items are to be entered as complement values in the balance accumulator and debit items as direct values, then the debit cards may be provided with an additional perforation located in advance of the zone wherein the item values are punched. This additional indicating or characterizing perforation reaches the analyzing device in advance of the perforation in the item zone indicating values. When the brushes encounter the characterizing perforation, the tabulating machine is set to enter the direct value or number in the balance accumulator. When there is no characterizing perforation, the machine is set to enter complement values in the balance accumulator.

The above, it will be understood, is only one particular method of carrying out the object of this invention. It is obvious, for example, that means may be provided whereby the presence of a characterizing hole in a card would set the balance accumulator for entering complement values whereas the absence of a characterizing hole would set said balance accumulator direct for entering values. The net result, in either case, would be that the balance accumulator performs a balancing operation, adding one class of items and subtracting another, all under control of a card having both classes of items punched thereon with their direct values.

The object of this invention is more specifically to transmit direct values designated on cards as complement values to an accumulator or other similar devices.

The object of this invention is further to control an accumulator for automatically and selectively operating it in different ways.

Another object of this invention is to selectively assign the true values designated on a series of cards to accumulators in accordance with the class of items to which said values belong.

Still another object is to accomplish the above selective assignment at the same time that said values are transmitted to a balance accumulator as a complement value or a direct value depending on the class of items to which said values belong.

Other objects and advantages of this invention will be apparent from the specification and the accompanying drawing which show one embodiment of this invention and wherein similar reference numerals indicate similar parts.

In the drawing:

Fig. 1 illustrates diagrammatically a machine for operating upon cards of different classes, each having its direct values designated on the cards, and shows the condition of the machine during the analyzing operation but just prior to analyzing the perforation characterizing a debit card.

Fig. 2 is a detail of a portion of a card for use in this machine.

Fig. 3 is a view in side elevation of the so-called "elusive one" magnet and supplementary unit entering devices for the balance accumulator shown in operated position.

It will be understood that the showing has been made very diagrammatic as an aid to an easy understanding of the invention.

The card 20 is provided with the usual item field containing designated positions for receiving perforations representing the digits. This card is fed through the tabulator with the nine index point position leading. In advance of the item field is a posiiton indicated at 21 in which a perforation may be placed to indicate the nature of the item represented on the card. It may be assumed that if a credit item is punched on the card, no perforation will be punched in position 21 and if a debit item is punched on the card a perforation will be punched in this position. In Fig. 2, the card is shown as punched with a debit item and therefore having the characterizing perforation in position 21.

The adding wheel of an accumulator for receiving credit amounts is indicated at 22, the adding wheel for receiving debit amounts is indicated at 23, and the adding wheel of the balance accumulator is indicated at 24. Each adding wheel has associated therewith a coupling member 25, 26, and 27, respectively, which is constantly rotated and which, if coordinated with the adding wheel, rotates this wheel as long as the coupling is maintained. Springs 28 and 29 hold the coupling members 25 and 26 in released position provided magnets 30 and 31 are not energized. Spring 32 tends to hold the coupling member 27 of the balancing device in engaging position for rotating wheel 24.

In order to prevent coupling of the wheel 24 before the nine index point position of the card reaches the analyzing brush 33, means such as a cam 34 may be utilized to hold the coupling 27 out of engagement with the wheel until the nine position of the card reaches the analyzing device.

Coupling member 27 is controlled by two magnets 35 and 36 having their windings reversed relative to each other. In series with the winding 36 is a selector magnet 37 the armature 38 of which is normally held, by spring 39, in series with the winding of magnet 30. If magnet 36 is energized, then magnet 37 will also be energized and attract armature 38 against the force of spring 39 to place the armature in series with magnet 31.

When a credit card, that is one which has no characterizing perforation in position 21 is passing through the machine, a circuit energizing magnet 30 is set up as soon as the analyzing brush 33 encounters a perforation in the item zone of the card. This circuit is established from one side 40 of the power source to the rotary analyzing contact drum 41, through the hole in the card, to the brush 33, through contacts 42, which close at the "9" index point position and therefore are normally closed during the adding cycle, through magnet 30, armature 38, contacts 44 and to the other side 45 of the power source. Energization of magnet 30 effects clutching of the coupling 25.

As soon as magnet 30 is energized, the usual counter magnet holding contacts 46 are closed by the action of the coupling arm on coupling 25 thereby establishing a holding circuit through the magnet from power side through line 47, contacts 46, magnet 30, armature 38, contacts 44 and to power side 45. The holding circuit remains effective to hold the coupling 25 engaged until the end of the adding cycle when cam 48 permits contacts 44 to open, thus entering the true number punched on the card into the wheel 22.

At the same time that a circuit is set up by the analyzing contacts through an item perforation to energize magnet 30, a circuit is also set up which energizes magnet 35 of the balance accumulator. It will be recalled that the coupling 27 of the balance accumulator was released for engagement with the wheel as soon as the nine position of the card reached the analyzing brush. The spring 32 holds the coupling 27 engaged and thereby the wheel 24 rotates until an item perforation reaches the analyzing brush, when it is released by the circuit which energizes magnet 35. This circuit is established from supply side 40, through analyzing contacts 41 and 33, contacts 42, magnet 49, magnet 35, through contacts 44 and to supply side 45. Energization of magnet 35 attracts the arm of coupling 27, releasing the coupling from the wheel 24 which ceases to rotate. In order to keep magnet 35 energized during the entry of this complement, a holding circuit is established by energization of magnet 49 which attracts its armature 50 to close contacts 51, the circuit then passing from power side 40 through line 59, contacts 51, magnet 49, magnet 35 and to power side 45. Since the wheel 24 of the balance accumulator is rotated from the nine position on the card until the item perforation reached the analyzing brush, it entered the nine complement of the item perforation. For example, if a credit item perforation is in position 3 as shown in Fig. 2, and no perforation is in position 21, the adding wheel 24 rotates from position 9 to position 3 or a total of 6 steps which is the nine complement of 3. Similarly, the nine complement of all credit items punched on the cards with true values are entered into wheel 24 while the true values are entered into wheel 22.

If a debit card, characterized by a perforation in position 21 for each controlling card column now runs through the machine, as soon as the analyzing brush encounters the characterizing perforation, a circuit is established through the magnet 36 as follows: from power side 40, contact roll 41, through the analyzing contacts 33, contacts 53 (since contacts 42 are now open as will be presently explained in detail) which are closed by cam 54 as soon as the position 21 reaches the analyzing brush, through magnet 55, magnet 36, magnet 37, contacts 44 and power side 45. Energization of magnet 55 establishes a holding circuit from power side 40, through contacts 56 which are closed when magnet 55 is energized, magnet 55, and as before to power side 45. This holding circuit is necessary because cam 54 permits contacts 53 to open as soon as the nine position of the card reaches the analyzing brush. The object of thus opening the contact is to prevent establishment of a circuit through magnet 36 when an item perforation in a credit card reaches the analyzing brush. Upon energization of magnet 36, it attracts the arm of clutch 27 thereby preventing the coupling from engaging wheel 24 when the coupling is released by cam 34 as the nine position of the card reaches the analyzing brush 33.

Incidentally when the perforation in position 21 of the card reaches the brush 33, cam 57 opens contacts 42 and keeps them open until position 9 of the card reaches the brush when they close. The object of thus opening contacts 42 is to prevent a circuit being established through line 58 to energize magnets 30 and 35 when the characterizing hole 21 of the debit card reaches the analyzing brush. As described previously, in connection with the passage of the credit card through the machine, it is desired to energize magnets 30 and 35 together only when a credit perforation reaches the analyzing brush. Were magnet 36 energized at the same time as magnet 35 upon an item perforation in a credit card reaching the analyzing brush, then since the two magnets neutralize each other in effect, the coupling 27 would not be attracted and wheel 24 would continue to rotate and fail to register the complement of the credit item. For this reason, the contacts 53 are opened preventing energization of magnet 36 during the passage of the item zone of a credit card.

Again were magnets 35 and 36 energized simultaneously upon perforation 21 of the debit card reaching the analyzing brush, then wheel 24 would be set in rotation as soon as the cam 34 released the coupling 27 at the nine position of the card. This is prevented by opening of contacts 42 preventing energization of magnet 35 as the 21 position of the card reaches the analyzing brush.

The magnet 36 alone having been energized upon the perforation in position 21 of a debit card encountering the analyzing brush, the coupling 27 is prevented from engaging wheel 24 to effect rotation thereof.

The same circuit which energizes magnet 36 also energizes magnet 37, as described above.

Energization of magnet 37 attracts armature 38 which is thus placed in series with magnet 31. The circuit through magnet 31 is not completed at this time, however, because contacts 42 have been opened by cam 57 and an impulse cannot pass through line 58 when the brushes contact through the perforation in position 21 of the debit card.

As the debit card continues its passage through the machine, the analyzing brush encounters the item perforation, for example, in the three position of the card as shown in Fig. 2. A circuit is thus established from power side 40, through the analyzing contacts 41 and 33, contacts 42 closed during the adding cycle, magnet 31, armature 38, contacts 44 and to power side 45. At the same time, a circuit is completed through line 59, contacts 51, now closed, to magnet 35 and to power side 45 through contacts 44. Magnets 31 and 35 are thus simultaneously energized. Energization of magnet 31 attracts coupling 26 to engage it with wheel 23 and effect rotation thereof. Energization of magnet 31 continues through the holding circuit established through contacts 60a similar to contacts 46 of magnet 30. The excitation of magnet 35 serves to counteract the excitation of magnet 36 established previously as described above. Coupling 27 is thus released by the magnets and engages wheel 24 to rotate it in unison with wheel 23. Rotation of wheels 23 and 24 continues until the end of the adding cycle when contacts 44 open, thus adding to the number on the wheels the direct value of the item perforation on the debit card.

As is well known, in subtraction by the complementary process it is necessary to add 1 to the units order column of the balance accumulator 24 into which a complement value is being added. For this purpose a magnet 60 is provided and is controlled in a manner to be described hereinafter. When this magnet is energized it will attract its armature 61 to which is fixed a latch lever 62 causing the latter to move downward to release latch 64 from the lug 66, allowing spring 68 to bring carry lever 69 into the position shown in Fig. 3 so that pawl 70 may drop into another tooth on ratchet wheel 71 which is fixedly secured to the units order adding wheel. Then when lever 69 is restored to its normal latched position by bail 72 when the bail is shifted to the right it will move adding wheel 24 to the next higher position thus adding "one". Some of the above mechanism employed as a transfer mechanism will be found in Hollerith Patent No. 974,272, issued November 1, 1910. Magnet 60 is connected to line side 45 by wire 73 and is in series with contacts 74 normally closed by the spring blade 75 and is also in series with cam controlled contacts 76. Wire 77 from the latter connects the other side of magnet 60 to the line side 40. Contacts 76 are controlled by cam Z and close for a short time at the end of the adding cycle or after the analyzation of the "0" index point to enter the extra unit for every operation involving the entry of a credit. If the entry changes to debit, the closure of contacts 53 at the position sensing the perforation 21 will energize magnet 55 as previously stated to draw downward the lower contact plate to open contacts 74 which will be thus held by a detent 78. Detent 78 is necessary to keep contacts 74 open after the adding cycle or during transfer time since magnet 55 is deenergized by opening of contacts 44 when the "0" perforation has been analyzed. Contacts 74 are released for closure at the end of each machine cycle by shifting of the detent 78 by an operating bar 79 which may have suitable connections to the operating parts of the machine.

In this manner, when a debit card runs through the machine, the value of an item thereon is entered as a direct number into the balance accumulator 24 as well as into the debit accumulator 23. When a credit card runs through the machine, the direct value of an item therein is entered into credit accumulator 22 and its nine complement supplemented by the fugitive unit into balance accumulator 24. Debit accumulator 23 will show the sum of the debit items, credit accumulator 22, the sum of the credit items, and balance accumulator 24, the difference between the debit and credit items. A credit balance would be shown as a complement on the balance accumulator while a debit balance would be shown as a true value. The complement value may be read as a true value by mentally computing the tens complement thereof.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

What is claimed as new is as follows:—

1. In a record controlled tabulating machine, an accumulating device, means for analyzing records bearing designations, means for initiating operation of said device at a predetermined time, and means controlled by the analyzing means upon encountering a designation for interrupting operation of said device at a differential time to enter in the accumulating device the complement of the number represented by the analyzed record.

2. In a record controlled machine, an accumulating device, means for analyzing records bearing designations, means for initiating operation of said accumulating device at a predetermined time, means controlled by the analyzing means for interrupting operation of said device at a differential time in accordance with the designation on the record to thereby enter a complement in the accumulating device, and control means for preventing said initiating means from being operative until a designation is located by said analyzing means at which time the operation of said accumulating device is effected and subsequently terminated when a direct number has been entered therein.

3. In a record controlled machine, an accumulating device, means for analyzing records bearing item and classification designations, means for initiating operation of said accumulating device at a predetermined time and means controlled by the analyzing means for interrupting operation of said device at a differential time in accordance with the item designation on a record analyzed to enter a complement in the accumulator device, control means for preventing said initiating means from being operative until an item designation is located by said analyzing means, said interrupting means preventing operation of said control means to cause operation of the accumulating device to enter a direct number therein, and means for selecting the operation of the control means in accordance with the presence or absence of a classification designation on a record.

4. In a tabulating machine, means for analyzing records bearing item designations, an accumulating device, means directly controlled by the analyzing means for normally entering the complement of the number represented by the item designation of one type of record analyzed, and control means controlled by the analyzing mechanism and effective upon the analyzing of another type of record for causing said entering means to enter a direct number in accordance with the item designation of the record analyzed.

5. In a tabulating machine, means for analyzing item and characterizing designations of records while in motion, an accumulating device, means controlled by said analyzing means upon encountering a characterizing designation on one of said records for entering a direct number in said accumulating device in accordance with the item designation of the record, and means controlled by said analyzing means for entering in the accumulating device the complement of the item designation of a record not bearing a characterizing designation.

6. In a tabulating machine, analyzing means for searching item designations on the records, an accumulating device, means for initiating operation of said accumulating device at a predetermined time, and control means controlled by the analyzing means for rendering the initiating means ineffective until the analyzing means encounters an item designation and for effecting thereafter operation of the accumulating device to enter a direct number represented by the item dsignation of the record.

7. In a tabulating machine, analyzing means for searching record designations, an occumulating device, means effective upon the presenc of one type of record for initiating operation of the accumulating device at a differential time in accordance with the designation located by the analyzing means to enter a direct number in the accumulating device and means controlled by the analyzing means upon the presence of another type of record for interrupting operation of the accumulating device at differential times to enter in the accumulating device the complement of the designation.

8. In a tabulating machine, analyzing means for searching designations of a record while in motion, an accumulating device, means for initiating operation of said accumulating device synchronous with record movement at a predetermined time, means controlled by the analyzing means for interrupting operation of said accumulating device until the analyzing means encounters a designation in the movement of the record, and means for then rendering the interrupting means ineffective to thereby enter a direct number of said accumulating device.

9. In a tabulating machine, analyzing means for locating designations on a record, an accumulating device, means for initiating operation of said accumulating device at a predetermined time, control means controlled by the analyzing means upon encountering a designation for interrupting the operation of said accumulating device at a differential time to enter in the accumulating device a complement of the number represented by the designation, and means comprising a control magnet controlled by said analyzing means to prevent operation of the control means to enter in the accumulating device the direct number represented by the designation of the record.

10. In a tabulating machine, analyzing means for locating item and classification record designations, a pair of accumulating devices, means controlled by the analyzing device for selecting either one or the other of the accumulating devices for operation in accordance with classification designations to enter the direct numbers in the selected accumulating device represented by item designations of the record, a balance accumulator device, and means controlled by the selecting means for transmitting direct numbers or complements of the number represented by item designations into said balance accumulator.

11. In a tabulating machine, a brush for reading record designations, an accumulating device, means for initiating operation of the accumulating device at a predetermined time, means controlled by the analyzing brush for preventing operation of said accumulating device until said brush locates a designation, and means controlled by said analyzing brush upon locating a designation for causing operation of the accumulating device.

12. In a tabulating machine, a brush for reading record designations, an accumulating device, means for initiating and stopping the operation of the accumulating device at fixed times, and means controlled by said brush for selectively effecting an entry into said accumulating device of a direct number, or a complement of the number represented by the designation encountered by the brush.

13. In a tabulating machine, means for analyzing designations on records, an accumulating device, a control magnet for said accumulating device energization of which is determined by said analyzing means at differential times dependent upon the designation analyzed to control the entry into the accumulating device of the complement of the number represented by the designation, a second control magnet energized under control of the analyzing means for rendering said first control magnet ineffective to thereby control the entry in said accumulating device of a direct number represented by the designation analyzed, and means for operating the accumulating device.

14. In a tabulating machine, means for analyzing designations on records, an accumulating device, means for initiating operation of said accumulating device at a predetermined time, a control magnet energized under control of the analyzing means preventing operation of said accumulating device until the record designation reaches the analyzing means, and a second control magnet energized upon the analyzing means encountering said designation for rendering the first magnet ineffective to control the accumulator.

15. In a tabulating machine, an analyzing means for searching a number representing designation on a record, an accumulating element, and means controlled by said analyzing means for selectively moving said element a differential amount in one direction either before or after a number designation is encountered by the analyzing means and while the analyzing means is still searching the record.

16. In a tabulating machine, an analyzing device for searching records bearing number designations and classification designations, an accumulating element, means controlled by the analyzing device while searching a record for moving said element a certain differential amount in one direction in accordance with the number designation, means controlled by the analyzing device for moving said element another differential amount in accordance with the number designation, and mechanism controlled by the analyzing device for selecting, in accordance with the classification designation one of said means for operation.

17. In an accounting machine, an accumulating device, means for analyzing records bearing designations, means for initiating operation of said accumulating device at a predetermined time, and electro-magnetic means controlled by the analyzing means upon encountering a record designation for interrupting the operation of said accumulating device at a differential time to enter in the accumulating device the complement of the number represented by the designation on the record.

18. In an accounting machine, an accumulating device, electrical means for analyzing records bearing designations, a pair of electro-magnetic devices, and means whereby said electro-magnetic devices under control of the electrical analyzing means cause the operation of said accumulating device differential extents commensurate with the number represented by the designation on the record analyzed.

19. In an accounting machine, an accumulating device, electrical means for analyzing records bearing designations, a pair of electro-magnetic devices, means whereby one of said electro-magnetic devices prevents the initiation of said accumulating device at a predetermined time, and means whereby the other electro-magnetic device under control of the analyzing means upon encountering a record designation causes at a differential time the initiation of the operation of said accumulating device and a continued operation to another predetermined time.

20. In an accounting machine, an accumulating device, electrical means for analyzing a record bearing a designation, a pair of electro-magnetic devices reversely wound with respect to each other, means whereby energization of one of said electro-magnetic devices prevents the initiation of the operation of said accumulating device, and means whereby said electrical analyzing means upon encountering a record designation causes the energization of the other electro-magnetic device to effect the neutralization of the first electro-magnetic device energized, said accumulating device thereupon being operated and up to a predetermined time.

HERMANN ADALBERT WEINLICH.